United States Patent [19]
Patel et al.

[11] Patent Number: 5,802,572
[45] Date of Patent: Sep. 1, 1998

[54] WRITE-BACK CACHE HAVING SUB-LINE SIZE COHERENCY GRANULARITY AND METHOD FOR MAINTAINING COHERENCY WITHIN A WRITE-BACK CACHE

[75] Inventors: Rajesh Bhikhubhai Patel; Soummya Mallick, both of Austin, Tex.

[73] Assignee: International Business Machines Corporation, Armonk, N.Y.

[21] Appl. No.: 616,612

[22] Filed: Mar. 15, 1996

[51] Int. Cl.⁶ .................... G06F 13/00; G06F 12/00
[52] U.S. Cl. .................... 711/143; 711/144; 711/141; 711/128
[58] Field of Search .................. 395/468, 470, 395/471, 455; 711/141, 143, 144, 128

[56] References Cited

U.S. PATENT DOCUMENTS

| | | | |
|---|---|---|---|
| 4,811,209 | 3/1989 | Rubinstein | 711/144 |
| 4,914,573 | 4/1990 | Scales, III et al. | 711/144 |
| 5,014,195 | 5/1991 | Farrell et al. | 711/128 |
| 5,029,070 | 7/1991 | McCarthy et al. | 711/143 |
| 5,155,824 | 10/1992 | Edenfield | 711/143 |
| 5,301,296 | 4/1994 | Mohri et al. | 711/128 |
| 5,586,297 | 12/1996 | Bryg et al. | 711/143 |

*Primary Examiner*—Glenn Gossage
*Attorney, Agent, or Firm*—Brian F. Russell; Andrew J. Dillon

[57] ABSTRACT

A write-back cache memory and method for maintaining coherency within a write-back cache memory are disclosed. The write-back cache memory includes a number of cache lines for storing data associated with addresses within an associated memory. Each of the cache lines comprises multiple byte sets. The write-back cache memory also includes coherency indicia for identifying each byte set among the multiple byte sets within a cache line which contains data that differs from data stored in corresponding addresses within the associated memory. The write-back cache memory further includes cache control logic, which, upon replacement of a particular cache line within the write-back cache memory, writes only identified byte sets to the associated memory, such that memory accesses and bus utilization are minimized.

19 Claims, 3 Drawing Sheets

WRITE-BACK CACHE HAVING SUB-LINE SIZE COHERENCY GRANULARITY AND METHOD FOR MAINTAINING COHERENCY WITHIN A WRITE-BACK CACHE

BACKGROUND

1. Technical Field

The technical field of the present specification relates in general to a cache memory and in particular to maintaining coherency within a write-back cache memory. Still more particularly, the technical field of the specification relates to a write-back cache memory and method for maintaining coherency within a write-back cache memory, which indicate the modification of data contained within each cache line at sub-line size granularity.

2. Description of the Related Art

A cache is a small amount of expensive high-speed memory, which is commonly utilized within a data processing system to improve the access time to data stored within an associated memory, thereby decreasing processor latency. A cache typically comprises a number of cache lines, which each include several bytes of data. Data stored within memory is mapped into a cache utilizing an index portion of the memory addresses associated with the data, such that multiple memory addresses having the same index portion map to the same cache line. Cached data associated with a particular memory address is distinguished from data associated with other addresses having the same index portion by an address tag, typically the high order address bits, which is stored in association with the cached data. In order to minimize the conflict between data associated with addresses having identical index portions, many caches provide multiple ways or storage locations for each cache line.

When data requested by the processor does not reside within the cache, a cache miss occurs and the requested data is fetched from memory. In order to accommodate the requested data within the cache, the data resident within a way of the cache line to which the requested data maps often must be replaced or "cast-out." If the cache has multiple ways, the replaced cache location is typically selected utilizing an algorithm, such as a least recently used (LRU) algorithm, in order to avoid casting-out data that has a high probability of being requested by the processor. A cache location can be similarly replaced or "pushed-out" if a snoop of the cache location reveals that the data contained within the cache location is inconsistent with more recent data stored within the corresponding memory address.

Coherency between cached data and data stored in memory is enforced by a cache coherency protocol, typically implemented by the processor or a cache controller. If a data access is designated as a write-through, any update to the cached data is automatically written to memory, thus enforcing coherency between the cache and the memory upon the completion of the data access. Write-back caches, on the other hand, enforce data coherency only when a copyback operation is performed in response to a cache line replacement or during periods of low bus activity. Because write-back caches entail lower bus utilization, write-back caches are generally preferable to write-through caches from a performance standpoint if the software and hardware environment permit the concomitant looser coherency.

Cache coherency and replacement operations are typically performed on a line-by-line basis. Accordingly, each way of each cache line within a conventional write-back cache has an associated bit that indicates whether any of the data bytes contained within the way have been modified since the data bytes were written into the cache. When a way that contains modified data is replaced, a copyback operation is invoked that writes each byte of the replaced way to the corresponding memory address. Because the length of a cache line is typically several times the bandwidth of the bus to which the cache is coupled, such copyback operations usually require several multi-cycle bus transactions or "beats" to complete.

Although a write-back cache provides enhanced performance compared with caches implementing a write-though architecture, a conventional write-back cache unnecessarily consumes bus bandwidth when fewer than all of the data bytes within a replaced way are modified since the unmodified data bytes are written to memory needlessly. The write-back of unmodified data bytes not only consumes bus bandwidth and therefore decreases overall system performance, but also, as is of particular importance in battery-powered (e.g., portable) computing environments, dissipates power in enabling the cache and driving the bus. Consequently, it is apparent that a write-back cache is needed that eliminates write-backs of unmodified data to memory.

SUMMARY

It is therefore an object of the present invention to provide a cache memory.

It is another object of the present invention to provide an improved method for maintaining coherency within a write-back cache memory.

It is yet another object of the present invention to provide an improved write-back cache memory and method for maintaining coherency within a write-back cache memory, which indicate the modification of data contained within each cache line at sub-line size granularity.

The foregoing objects are achieved as is now described. A write-back cache memory and method for maintaining coherency within a write-back cache memory are disclosed. The write-back cache memory includes a number of cache lines for storing data associated with addresses within an associated memory. Each of the cache lines comprises multiple byte sets. The write-back cache memory also includes coherency indicia for identifying each byte set among the multiple byte sets within a cache line which contains data that differs from data stored in corresponding addresses within the associated memory. The write-back cache memory further includes cache control logic, which, upon replacement of a particular cache line within the write-back cache memory, writes only identified byte sets to the associated memory, such that memory accesses are minimized.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
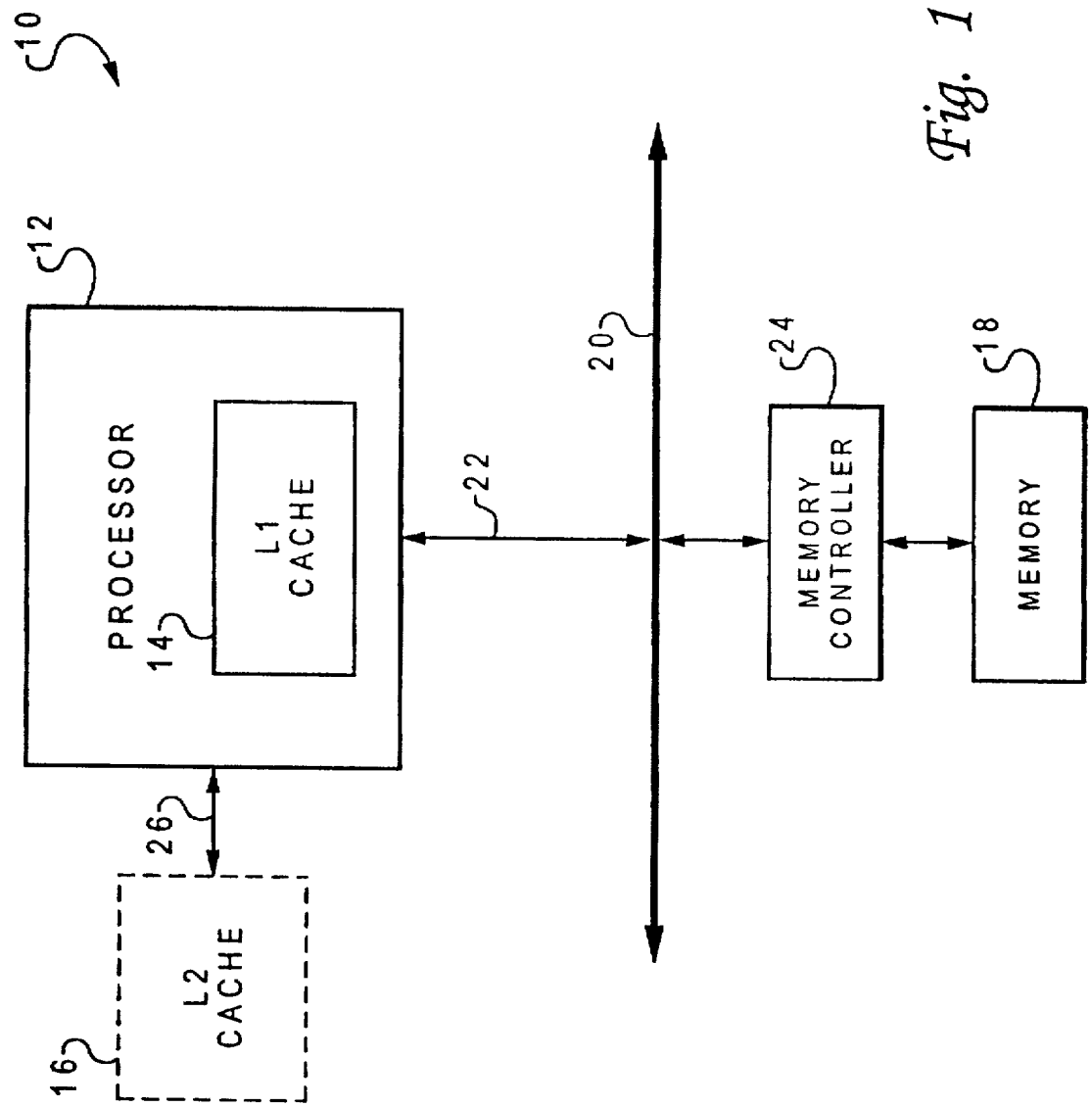
FIG. 1 illustrates a block diagram of an illustrative embodiment of a data processing system, including at least one write-back cache.

With reference now to the figures and in particular with reference to FIG. 1, there is depicted a pictorial representation of a data processing system, which includes an illustrative embodiment of the write-back cache to which the appended claims are directed. As illustrated, data processing system 10 includes processor 12, on-board level one (L1) cache 14, optional level two (L2) cache 16, memory 18, system bus 20, processor bus 22, and memory controller 24.

Processor 12 executes software instructions, which are stored in memory 18 or are received by processor 12 from another device coupled to system bus 20. In order to avoid the latency incurred by repeated accesses to memory 18, instructions and data retrieved from memory 18 are stored within L1 cache 14 or L2 cache 16 (if present) due to the probability that the instructions and data will be requested again. Processor 12 preferably comprises one of the PowerPC®line of microprocessors available from IBM Microelectronics of Essex Junction Vt., which operate in accordance with reduced instruction set computing (RISC) techniques; however, those skilled in the art will recognize that processor 12 could also be implemented utilizing an 80×86, PENTIUM (a trademark of Intel Corporation, or other suitable processor.

L1 cache 14 comprises a small (e.g., 16 Kbyte) high-speed memory, which permits the registers and execution units within processor 12 rapid access to data and instructions recently retrieved from memory 18 via high-speed processor bus 22 and system bus 20. As described above, L1 cache 14 is preferably configured as a write-back cache in order to maximize the performance of data processing system 10 by reducing the bandwidth of system bus 20 utilized to write back data to memory 18. However, in one embodiment of L1 cache 14, accesses to data contained within L1 cache 14 can be configured by software as either write-through or write-back on a per cache line basis. Although illustrated as a unified cache, that is, a cache that stores both data and instructions, those skilled in the art will appreciate that L1 cache 14 can alternatively be implemented as two distinct data and instruction caches.

As indicated by dashed line illustration, processor 12 can be coupled to an optional L2 cache 16. Like L1 cache 14, L2 cache 16 comprises a high-speed memory that contains a subset of the data and instructions stored within memory 18. In order to maximize data access efficiency, L2 cache 16 is preferably larger in size than L1 cache 14 and is also configured as a write-back cache. Although illustrated as coupled to processor 12 via a dedicated bus 26, those skilled in the art will appreciate that L2 cache 16 can alternatively be implemented on-board processor 12, coupled to processor bus 22 in an in-line or look-aside configuration, or coupled to system bus 20.

In the depicted illustrative embodiment, memory 18 comprises a random access memory (RAM) having an associated memory controller 24. Memory controller 24 generates read enable and write enable signals to facilitate storage and retrieval of data and includes address translation facilities that map logical addresses utilized by processor 12 into physical addresses within memory 18. As will be appreciated by those skilled in the art, memory 18 can comprise a number of individual volatile memory modules which store data and segments of operating system and application software while power is supplied to data processing system 10. Those skilled the art will further appreciate that in addition to memory 18, numerous types of devices can be coupled to system bus 20 for interaction with processor 12, L1 cache 14, L2 cache 16, and memory 18; however, devices not necessary for an understanding of the illustrative embodiment described herein have been omitted for the sake of simplicity.

Figure 2:
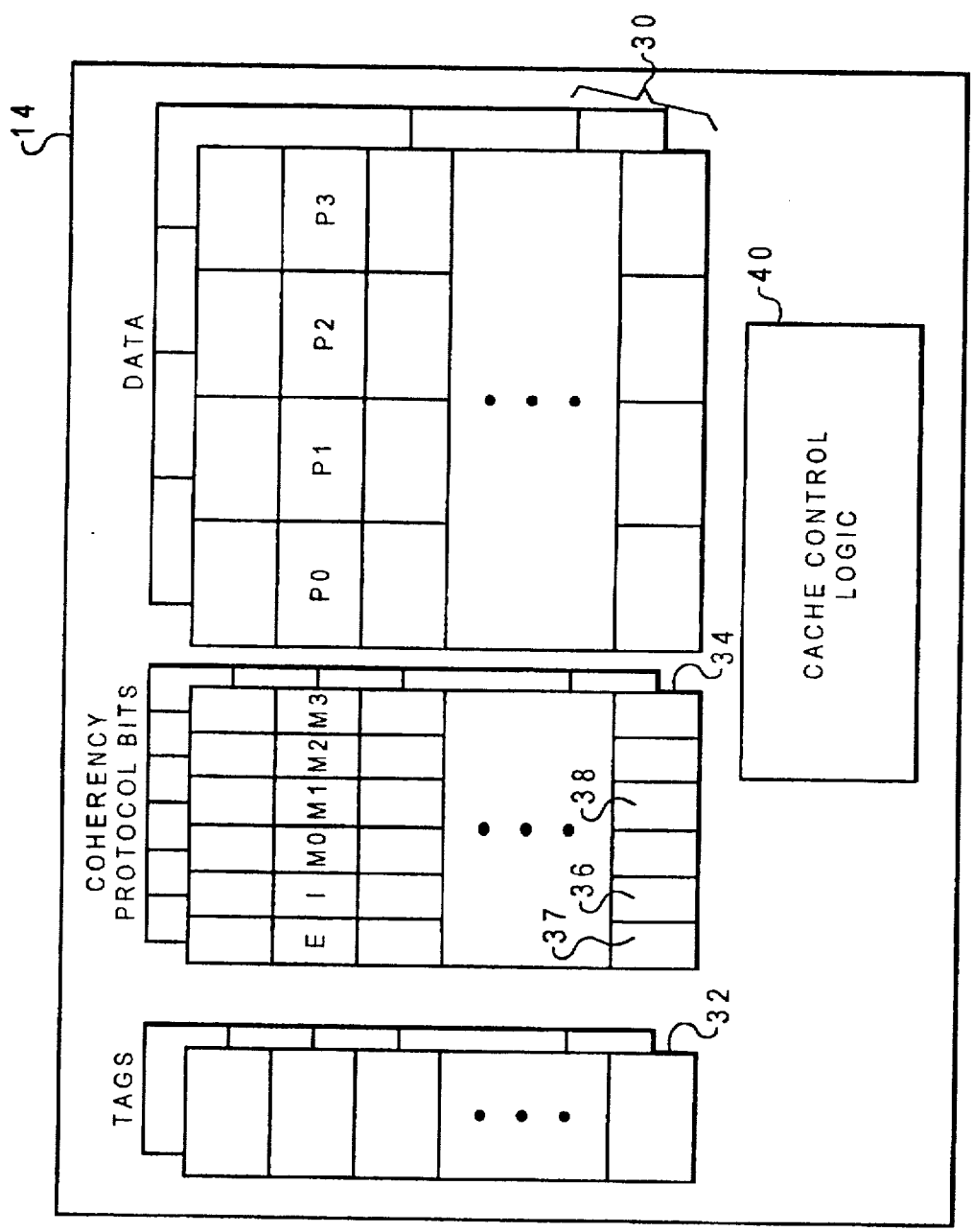
FIG. 2 depicts a pictorial representation of an illustrative embodiment of a write-back cache.

Referring now to FIG. 2, there is illustrated a pictorial representation of a write-back cache in accordance with the illustrative embodiment of a data processing system depicted within FIG. 1. Although the write-back cache illustrated within FIG. 2 is identified as L1 cache 14, it will be understood that the pictorial representation of a write-back cache depicted within FIG. 2 is equally applicable to L2 cache 16. In the depicted illustrative embodiment, L1 cache 14 is a two-way set associative cache comprising a number of cache lines 30, which each include four bus packets P0–P3 in each of two ways. Each bus packet P0–P3 comprises one or more bytes of data and preferably has a packet size equal to the width of processor bus 22 and system bus 20. Thus, for example, if processor bus 22 and system bus 20 are 64-bit busses, each of bus packets P0–P3 preferably includes 8 bytes of data.

As with conventional caches, data is mapped into a particular cache line 30 of L1 cache 14 by an index portion of the memory address which stores the data. When stored within L1 cache 14, data associated with a particular memory address is distinguished from data associated with other addresses having the same index portion by an address tag 32, which preferably comprises the high-order bits of the physical address within memory 18 at which the data is stored.

L1 cache 14 further includes coherency protocol bits 34, which in the depicted embodiment implement the MEI (Modified, Exclusive, Invalid) cache coherency protocol. Those skilled in the art will appreciate that other cache coherency protocols, for example, the MESI (Modified, Exclusive, Shared, Invalid) protocol, could alternatively be implemented within L1 cache 14. Coherency protocol bits 34 comprise one exclusive bit (E) 37, one invalid bit (I) 36, and four modified bits 38 (labeled M0–M3) associated with each way of each cache line 30. When set, the exclusive bit 37 associated with a particular way of a cache line 30 indicates that the data block stored within that way is contained within L1 cache 14 only (not L2 cache 16) and is consistent with memory 18. The invalid bit 36 associated with a particular way of a cache line 30 is set to indicate that the data associated with the corresponding address tag 32 is not resident within L1 cache 14. For example, invalid bit 36 is set when a snoop hit occurs during a cacheable read or write access to the same location within memory 18 by a second bus master within data processing system 10. Each of modified bits (M0–M3) 38 is associated with a particular one of bus packets P0–P3 within the corresponding cache line way. Modified bits M0–M3 are set when the corresponding bus packet P0–P3 is modified with respect to memory 18. Thus, setting one of modified bits M0–M3 indicates that data within the corresponding bus packet is valid only within L1 cache 14 and must eventually be written back to memory 18 to maintain coherency.

Finally, L1 cache 14 includes cache control logic 40. In addition to implementing a cache coherency protocol by setting and clearing coherency protocol bits 34, cache control logic 40 generates address tags from logical addresses and selects cache lines for replacement according to an LRU algorithm.

Figure 3:
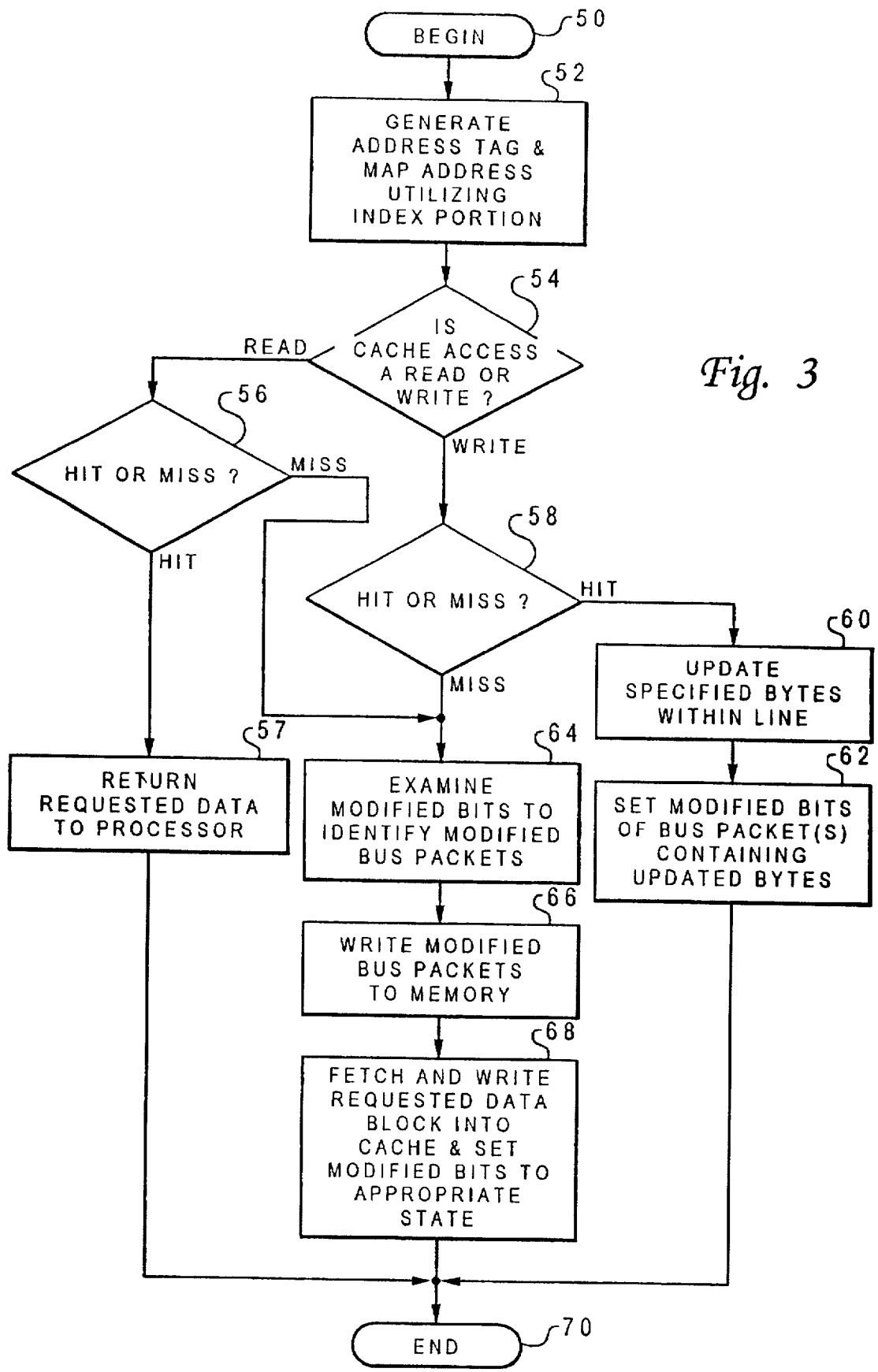
FIG. 3 is a flowchart of an illustrative embodiment of a method utilized to maintain cache coherency within a write-back cache.

With reference now to FIG. 3, there is illustrated a flowchart of a method which can be utilized to maintain cache coherency within data processing system 10 of FIG. 1. As illustrated, the process begins at block 50 when a cache access request is received from processor 12 by L1 cache 14. The process proceeds from block 50 to block 52, which depicts cache control logic 40 generating an address tag, that is, the high order bits of the physical address of the operand data, based upon the logical (effective) address of the operand data. In addition, cache control logic 40 maps the cache access request to a specified cache line 30 utilizing the index portion of the logical address.

Next, the process proceeds from block 52 to block 54, which illustrates a determination of whether or not the cache access request is a read request or a write request. In response to a determination that the cache access request is a read request, the process proceeds from block 54 to block 56.

Block 56 depicts a determination of whether the read request results in a hit or miss. The determination illustrated at block 56 is made by comparing the address tag generated at block 52 with the address tag 32 associated with each way of the specified cache line 30. If the generated address tag matches one of the address tags 32 associated with a way of the specified cache line 30, a cache hit occurs and the process proceeds to block 57, which illustrates L1 cache 14 returning the requested data to processor 12. Thereafter, the process terminates at block 70. However, if the read request misses L1 cache 14, the process passes to blocks 64–68, which as described below, depict the replacement of one of the ways of the specified cache line 30 to which the memory address of the requested data maps.

Returning to block 54, if a determination is made that the cache access request is a write to the specified cache line 30, the process proceeds from block 54 to block 58, which illustrates a determination of whether the write request results in a hit or a miss. The determination illustrated at block 58 is made by comparing the address tag generated at block 52 with the address tag 32 associated with each way of the specified cache line 30. If the generated address tag matches one of address tags 32, a hit occurs and the process passes to blocks 60 and 62. Blocks 60 and 62 depict updating the appropriate bytes within the specified cache line 30 and setting the modified bits 38 associated with the bus packets containing the updated bytes. Thus, in order to reduce the bus utilization required for write-backs, L1 cache 14 indicates the modification of cached data utilizing a smaller granularity than conventional write-back caches. The process then proceeds from block 62 to block 70, where the process terminates.

Referring again to block 58, if a determination is made that the cache access request results in a miss, that is, that the generated address tag does not match the address tag 32 associated with either way of the specified cache line 30, the process passes to blocks 64–68. As noted above, blocks 64–68 depict the write-back of a selected way of the specified cache line 30. In the illustrated embodiment, the replaced ways are selected according to an LRU algorithm that can be implemented by associating a single LRU bit with each of cache lines 30; however, those skilled in the art will appreciate that other replacement schemes can also be employed.

Still referring to FIG. 3, block 64 illustrates cache control logic 40 examining the modified bits 38 associated with the way selected for replacement within the specified cache line 30 in order to identify which of bus packets P0–P3 have been modified. Next, the process proceeds to block 66, which depicts writing only the bus packets marked as modified to memory 18. In contrast to conventional writeback caches, bus packets which are not marked as modified are simply cast out and are not written back to memory 18, thereby reducing the bus utilization required for a writeback. Next, the process proceeds to block 68, which illustrates fetching a data block containing the requested data from L2 cache 16 or memory 18 and writing the data block into the selected way of the specified cache line 30. In addition, the modified bits 38 associated with the selected way are set or cleared to indicate which bus packets P0–P3 contain modified data. Thus, if the replacement of the selected way was performed in response to a read miss, all of the modified bits 38 associated with the selected way are cleared; however, if the way was replaced due to a write miss, one or more modified bits 38 are set to indicate which of bus packets P0–P3 contain modified data. Thereafter, the process passes to block 70 and terminates.

The illustrative embodiment of a data processing system hereinbefore described provides an improved write-back cache that minimizes bus utilization for write-backs by maintaining modified coherency protocol information at sub-cache line granularity. Maintaining coherency protocol information on a per-bus packet basis is particularly advantageous within caches having a low set associativity in order to minimize thrashing.

While an illustrative embodiment has been particularly shown and described, it will be understood by those skilled in the art that various changes in form and detail may be made therein without departing from The spirit and scope of the illustrative embodiment.

What is claimed is:

1. A cache memory, comprising:
    a plurality of cache lines for storing data associated with addresses within an associated memory, each of said plurality of cache lines containing a plurality of byte sets, wherein write accesses to said plurality of cache lines can be configured as write-through or write-back on a per cache line basis;
    coherency indicia for identifying each byte set among said plurality of byte sets within a cache line that contains data that differs from data stored in corresponding addresses within said associated memory, said coherency indicia being set to identify a byte set within a particular cache line among said plurality of cache lines only in response to a write-back access to said particular cache line; and
    cache control logic that upon replacement of said particular cache line writes only identified byte sets to said associated memory.

2. The cache memory of claim 1, wherein said coherency indicia comprise a plurality of bits, wherein each of said plurality of bits is associated with one of said plurality of byte sets.

3. The cache memory of claim 1, wherein each of said byte sets includes a maximum number of bytes that can be simultaneously written to said associated memory by said cache memory.

4. The cache memory of claim 1, each of said plurality of cache lines having a plurality of ways that each contain a plurality of byte sets, wherein each of said plurality of ways has coherency indicia for identifying each modified byte set among said plurality of byte sets within said each way.

5. The cache memory of claim 1, wherein said cache memory comprises an upper level cache associated with a processor.

6. The cache memory of claim 1, wherein said cache control logic replaces said particular cache line according to a least recently used (LRU) algorithm.

7. The cache memory of claim 1, wherein said cache memory is a lower level cache.

8. A data processing system, comprising:
- a processor;
- an associated memory coupled to said processor;
- a cache memory coupled to said associated memory, said cache memory including:
  - a plurality of cache lines for storing data associated with addresses within said memory, each of said plurality of cache lines containing a plurality of byte sets, wherein write accesses to said plurality of cache lines can be configured as write-through or write-back on a per cache line basis;
  - coherency indicia for identifying each byte set among said plurality of byte sets within a cache line that contains data that differs from data stored in corresponding addresses within said associated memory, said coherency indicia being set to identify a byte set within a particular cache line among said plurality of cache lines only in response to a write-back access to said particular cache line; and
  - cache control logic, wherein upon replacement of a particular cache line within said cache memory, said cache control logic writes only identified byte sets to said associated memory.

9. The data processing system of claim 8, wherein said coherency indicia comprise a plurality of bits, wherein each of said plurality of bits is associated with one of said plurality of byte sets.

10. The data processing system of claim 8, wherein each of said byte sets includes a maximum number of bytes that can be simultaneously written to said associated memory by said cache memory.

11. The data processing system of claim 8, each of said plurality of cache lines having a plurality of ways that each contain a plurality of byte sets, wherein each of said plurality of ways has coherency indicia for identifying each modified byte set among said plurality of byte sets within said each way.

12. The data processing system of claim 8, wherein said cache memory comprises an upper level cache.

13. The data processing system of claim 8, wherein said cache control logic replaces said particular cache line according to a least recently used (LRU) algorithm.

14. The data processing system of claim 8, wherein said cache memory is a lower level cache and said data processing system further comprises an upper level cache associated with said processor.

15. A method for maintaining coherency within a cache memory having a plurality of cache lines, said method comprising:
- configuring each write access to data stored within said plurality of cache lines as write-through or write-back on a per cache line basis;
- storing data within a particular cache line among said plurality of cache lines, wherein said data stored within said particular cache line is associated with addresses within an associated memory;
- only for write-back accesses, identifying each byte set among a plurality of byte sets within said particular cache line which contains data that differs from data stored in corresponding addresses within said associated memory; and
- in response to replacement of said particular cache line within said cache memory, writing only identified byte sets to said associated memory.

16. The method for maintaining coherency within a cache memory of claim 15, said cache memory having a plurality of bits associated therewith, wherein said identifying step comprises setting a bit among said plurality of bits associated with each byte set to be identified.

17. The method for maintaining coherency within a cache memory of claim 15, said cache memory and said associated memory being coupled by a bus, wherein said writing step comprises simultaneously writing all bytes in an identified byte set to said associated memory via said bus.

18. The, method for maintaining coherency within a cache memory of claim 15, each of said plurality of cache lines having a plurality of ways that each contain a plurality of byte sets, wherein each of said plurality of ways has coherency indicia for identifying each modified byte set among said plurality of byte sets within each way, and wherein said identifying step comprises setting a bit associated with a byte set to be identified among a plurality of byte sets within a selected way of said particular cache line.

19. The method for maintaining coherency within a cache memory of claim 15, wherein said particular cache line is replaced according to a least recently used (LRU) algorithm.

* * * * *